(12) United States Patent
Kumakura

(10) Patent No.: US 6,456,401 B1
(45) Date of Patent: Sep. 24, 2002

(54) COMMUNICATION APPARATUS CAPABLE OF CONDUCTING REMOTE DIAGNOSIS USING COMMUNICATION CIRCUIT

(75) Inventor: Syunichi Kumakura, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/407,247

(22) Filed: Sep. 28, 1999

(30) Foreign Application Priority Data

Oct. 9, 1998 (JP) .......................................... 10-288452

(51) Int. Cl.$^7$ ................................................ H04N 1/00
(52) U.S. Cl. ........................ 358/440; 358/406; 358/438; 399/9
(58) Field of Search ................................ 358/400, 406, 358/434, 438, 440, 468; 379/100.05, 100.15, 1.01; 399/2

(56) References Cited

U.S. PATENT DOCUMENTS

| | | | | |
|---|---|---|---|---|
| 5,226,074 A | * | 7/1993 | Han ....................... | 379/100.05 |
| 5,345,495 A | * | 9/1994 | Black et al. ............... | 379/1.01 |
| 5,757,514 A | * | 5/1998 | Shibata et al. .............. | 358/434 |

FOREIGN PATENT DOCUMENTS

JP        10-164271      6/1998

* cited by examiner

*Primary Examiner*—Kimberly A. Williams
(74) *Attorney, Agent, or Firm*—Frishauf, Holtz, Goodman & Chick, P.C.

(57) ABSTRACT

An image forming apparatus includes: an image reading device for reading an original document image to form the image in a copying mode; a modem device for decoding data sent from a public network; a first memory for registering telephone identification information for a remote station; a detector for detecting a telephone identification provided with a caller identification service of a communication enterprise; and a controller for controlling the modem device, realizing a first communication mode for receiving facsimile data to form the image in a facsimile mode, or a second communication mode for diagnosis of the apparatus and for setting control information of the apparatus from the remote station through the modem device. The controller realizes the first communication mode when the telephone identification does not coincide with the registered telephone identification, and realizes the second communication mode when the telephone identification coincides with the registered telephone identification.

6 Claims, 7 Drawing Sheets

COMMUNICATION APPARATUS CAPABLE OF CONDUCTING REMOTE DIAGNOSIS USING COMMUNICATION CIRCUIT

BACKGROUND OF THE INVENTION

The present invention relates to a communication apparatus appropriately applicable to a facsimile device, or a hybrid device provided with a copy function, facsimile function and printer function, or similar devices, which can conduct a remote diagnosis by using the communication line.

Recently, with an advance of information processing technology and an improvement of information network, a case of use of a communication device provided with a plurality of communication modes, is increasing. In such types of communication devices, such a control is conducted that initially, in a certain communication mode, a communication line is connected, and then, when there is no response from a remote station for a predetermined period of time, the communication is switched to another communication mode. Further, in another communication mode, such a control is conducted that initially, the communication line is connected, and when a signal of a remote station, which shows a specific communication mode, is detected, the communication is switched to that communication mode.

Incidentally, in a facsimile device, or a hybrid device provided with a copy function, facsimile function and printer function, or similar devices, a case of use of a communication apparatus provided with a remote diagnosis mode and remote setting mode, is increased. In this type of communication apparatus, by a command from a control apparatus (hereinafter, called the center terminal) for office machines installed on a remote side, information inside the apparatus is read from the facsimile device, hybrid machine, or the like, provided on the user side, and by using a communication line, the information inside the apparatus is sent to the remote center terminal (remote diagnosis), or various kinds of data are set from the center terminal into the inside of the apparatus on the user side (remote setting).

FIG. 5 is a block diagram showing an example of a structure of this type communication apparatus 10. The communication apparatus shown in FIG. 5 has a communication terminal 2 connected a communication line 1. A CML relay 8 and a control section 3 are connected to the communication terminal 2, and when a ring signal showing the calling from the remote station is detected, the communication line 1 and the communication apparatus 10 are closed with each other by the CML relay 8 by a connection signal S0 from the control section 3, and the calling from the remote station is received.

A means 4 to switch a communication mode (hereinafter, called the mode switching means), for example, by software, is connected to the control section 3, and the mode switching means is controlled to select a facsimile mode 6 or a remote diagnosis mode 7 by a register rewriting signal S1 from the control section 3. The mode switching means 4 is provided with, for example, a command register 14, and normally, a control command to select a facsimile mode 6 (home position) is written therein by a register rewriting signal S1. A ROM 28 is connected to the mode switching means 4, and the algorithm to conduct the facsimile mode 6 or remote diagnosis mode 7 is stored therein.

Further, an in formation processing means 9 is connected to the CML relay 8, and information processing is conducted based on the algorithm to conduct the facsimile mode or remote diagnosis mode 7, which is read from ROM 28 by the control section 3 and the mode switching means 4. A timer circuit 5 is connected to the control section 3, and when a calling signal is received, the timer starts. For example, when 35 sec has passed from the start of the facsimile mode, a timer signal S2 showing "passage of 35 sec" is outputted to the control section 3, and the control command in a command register 14 provided in the mode switching means 4 is rewritten by the control section 3 based on the timer signal S2. According to this rewriting, the mode is switched from the facsimile mode 6 to the remote diagnosis mode 7 by the mode switching means 4.

Next, operations of the conventional type communication apparatus 10 will be described. FIGS. 6A and 6B are time charts showing an example of switching operations of the facsimile mode 6/remote diagnosis mode 7, and FIG. 7 is a flow chart showing the example of that switching. In this communication apparatus 10, in the case where no facsimile signal is detected from the remote station when 35 sec has passed from the starting time of the facsimile mode shown in FIG. 6B, then, the mode automatically shifts to the remote diagnosis mode 7. On this presupposition, after the ring is detected in step A1 of the flow chart in FIG. 7, the calling from the remote station is received in step A2. At this time, the facsimile mode 6 is selected by the mode switching means 4, and the facsimile mode 6 is started.

After that, the facsimile signal from the remote station is detected in step A3. When the apparatus of the remote station is recognized to be a facsimile, the sequence advances to step A4, and the facsimile mode 6 shown in FIG. 6A is continued. On the other hand, when the facsimile signal from the remote station is not detected and the apparatus of the remote station is not recognized to be a facsimile, in step A3, the sequence advances to step A5, and it is judged whether 35 sec has passed from the starting time of the facsimile mode. When 35 sec has not passed from the starting time of the facsimile mode, the sequence returns to step A3, and it is judged again whether the existence of the facsimile signal is detected.

Accordingly, when 35 sec has passed while the facsimile signal from the remote station is not detected after the facsimile mode is started in the time chart shown in FIG. 6B, the sequence advances to step 6, and after the facsimile mode is stopped, the sequence advances to step 7 and the remote diagnosis mode 7 is started. In this case, the control command in the command register 14 in the mode switching means 4 is rewritten by a register rewriting signal S1 by the control section 3 into which the timer signal S2 is inputted. Accordingly, by this rewriting of the control command in the register 14, in the mode switching means 4, the reading-out control of the ROM 28 is conducted such that the mode is switched by the software from the algorithm according to the facsimile mode 6 to the algorithm of the remote diagnosis mode 7.

However, according to the conventional type communication apparatus 10, when calling is received, initially the communication is started in the facsimile mode, however, when the facsimile signal of the remote station can not be detected for 35 sec from the start of the facsimile mode because the apparatus of the remote station is set to the remote diagnosis terminal, the content of the command register 14 can not be rewritten when "35 sec" has not passed, therefore, the mode can not be switched from the facsimile mode 6 to the remote diagnosis mode 7.

Accordingly, when the remote diagnosis mode 7 (hereinafter, called also the specific information processing mode) is conducted between the user of the communication apparatus 10 and the remote diagnosis central apparatus (hereinafter, called also the specific remote station), the connecting time of the communication line 1 to recognize the communication mode of the remote station increases to a long period of time, or when the public network such as NTT, or the like, is used, useless communication fee of the users is paid, which are problems.

SUMMARY OF THE INVENTION

Accordingly, the present invention solves the above-described problems, and the object of the present invention is to provide a communication apparatus by which the connection time to the communication line to recognize a communication mode of the remote station when a specific information processing mode is conducted to a specific remote station, can be reduced, and the communication fee for that communication can be reduced.

The object of the present invention can be attained by any one of the following structures.

(Structure 1) An image forming apparatus having multiple functions for forming an image on a recording sheet by a copying mode or a facsimile mode, the image forming apparatus comprising:
  (a) recording means;
  (b) image reading means for reading an image of an original document so as to form the image in the copying mode;
  (c) a modem device for decoding data sent from a public network;
  (d) a first memory for registering telephone identification information for a remote station;
  (e) detecting means for detecting a telephone identification provided with a caller identification service of a communication enterprise; and
  (f) a controller for controlling said modem device, the controller realizing a first communication mode for receiving facsimile data so as to form the image in the facsimile mode, or a second communication mode for diagnosis of the apparatus and for setting control information of the apparatus from the remote station through said modem device,
  wherein said controller realizes the first communication mode in the case the telephone identification detected by the detecting means does not coincide with a registered telephone identification of the remote station, and realizes the second communication mode in the case the telephone identification detected by the detecting means coincides with the registered telephone identification of the remote station.

(Structure 2) The apparatus of structure 1, wherein the communication of the first communication mode and the second communication mode are carried out through a common public network and a common modem device.

(Structure 3) The apparatus of structure 1 further comprising a setting means for setting whether or not said second communication mode is carried out,
  wherein when the setting means sets that the second communication mode is not carried out, it is prohibited that the first communication mode is switched over to the second communication mode, when the telephone identification detected by the detecting means coincides with a registered telephone identification of the remote station.

(Structure 4) The apparatus of structure 1 further comprising a codec section for compressing and decompressing data passed through said modem device.

(Structure 5) The apparatus of structure 1 further having a printing function for forming an image on a recording sheet on the basis of image data sent from a computer by a printing mode.

(Structure 6) The apparatus of structure 1 further comprising:
  a second memory for storing a control algorithm for conducting the first communication mode and a control algorithm for conducting the second communication mode, and
  an input means for inputting the telephone identification information to the first memory,
  wherein the controller selects one of the control algorithms in the second memory on the basis of the result of detection of the detecting means and the telephone identification information stored in the first memory.

According to the present invention, because the type of the terminal equipment of the specific remote station can be early recognized by the comparison means, the time period necessary to recognize the communication mode of the remote station can be more reduced than that of the conventional method. Accordingly, in the case where the remote diagnosis mode or the like is conducted with the remote diagnosis central apparatus, because the connection time to that communication line can be reduced, thereby, the communication fee of the user can be reduced.

DETAILED DESCRIPTION OF THE PREFERRED EMBODIMENTS

Figure 1:
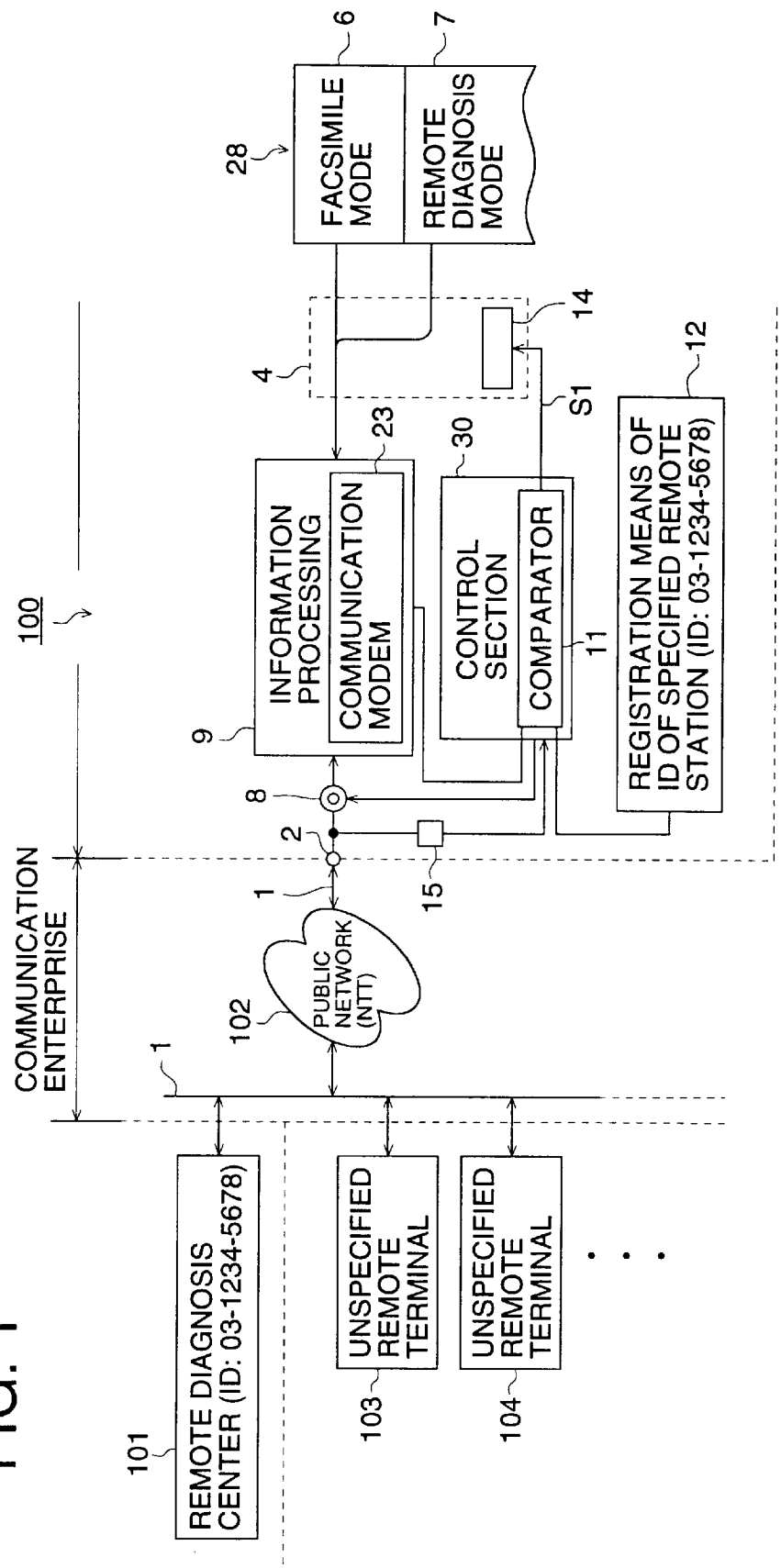
FIG. 1 is a block diagram showing an example of a structure of a communication apparatus 100 as an embodiment of the present invention and a communication system.

Referring to the drawings, an embodiment of the present invention will be described below. FIG. 1 is a block diagram showing an example of a structure of a communication apparatus 100 as an embodiment of the present invention and a communication system thereof.

In the present embodiment, in the case where a remote diagnosis mode in which the control information of the inside of the apparatus which is read from a facsimile device or a hybrid machine by using a communication line, is sent to a remote diagnosis central control apparatus (the control apparatus for office machines: hereinafter called the center terminal), and a remote setting mode in which the control information (data) sent from the center terminal is set inside the user apparatus, are conducted, the connection time to the communication line can be reduced, and the communication fee for the connection can be reduced.

In the present embodiment, for example, in a facsimile device, when a claim that a transmission error easily occurs, is made from the user side against the center side, the remote diagnosis mode is conducted (used) to direct the facsimile device to "send the communication control information" by using the communication line from the center terminal. In the facsimile device which receives the direction, the communication control information recorded inside the device is read out, and sent to the center terminal.

On the center terminal side, the communication control information read from the facsimile on the user side is analyzed by the operator of the center, and as the result, for example, it is found that the transmission error easily occurs when a document image is transmitted abroad, and when it is required as a remedy that the communication speed is lowered at the time of overseas transmission, in the remote setting mode, the center terminal rewrites the communication speed at the time of overseas transmission in the facsimile device to, for example, the communication speed which is 2-step lower than the present set value.

Accordingly, in the facsimile device which receives the direction in the remote setting mode, data can be automatically rewritten to the communication speed sent from the center terminal without any setting change operation by the user himself, with respect to the communication speed at the time of overseas transmission which is previously set inside the device itself.

The communication apparatus 100 according to the present invention conducts information processing with an arbitrary remote station or a specific remote station by using the caller ID service of the communication enterprise. According to this caller ID service, the telephone number of the caller station is notified to the called station when calling is received, and the telephone number of the caller station can be confirmed on the called station.

This communication apparatus 100 has a communication terminal 2 connected with the communication line 1 shown in FIG. 1. A ring detector 15 and the CML relay 8 are connected to the communication terminal 2, and a receiving terminal start signal such as a ringer or caller ID, is detected from the public network 102. A control section 30 is connected to the ring detector 15, and when the receiving terminal start signal is detected, the CML relay 8 is closed, and the communication apparatus 100 and the public network 102 are connected to each other (calling is received). An information processing means 9 is connected to the CML relay 8.

In this example, components are respectively controlled as follows: when initially, the caller ID receiving terminal start signal is detected, next, the control section 30 starts a communication modem 23 for the caller ID in the information processing means 9, and reads the telephone number of the remote station notified from the public network 102, and after that, opens the CML relay 8 once (primary response), and next, waits the detection of the ringer from the public network 102. A comparison means 11 is provided in the control section 30, and when the telephone number of the remote station detected by the communication modem 23 is inputted, the previously registered telephone number of the specific remote station and the telephone number notified by the communication enterprise are compared with each other. In this comparison means 11, by the result of comparison of telephone numbers of the two, when the telephone number of the specific remote station agrees with the telephone number notified by the communication enterprise, a register rewriting signal S1 is generated. The register rewriting signal S1 may be an active or inactive signal such as a high level or low level signal, or command data such as a coincidence flag.

To the control section 30, a means 4 for switching the mode, for example, by the software (hereinafter, called the mode switching means) is connected, and further, the ROM 28 is connected to the mode switching means 4, and the algorithm to conduct the facsimile mode 6 or the remote diagnosis mode 7 is stored therein. For example, a command register 14 is provided in the mode switching means 4, and the control command in the register 14 is rewritten by the register rewriting signal Si from the control section 30.

In this example, the register rewriting signal S1 is outputted from the comparison means 11 to the command register 14, and normally a control command to select the facsimile mode 6 (normal position) is written. When the content of the command register 14 is rewritten, the mode switching means 4 can switch the mode from the facsimile mode 6 to the remote diagnosis mode 7 by the software. Accordingly, in the information processing means 9 connected to the CML relay 8, the information processing is carried out based on the algorithm to conduct the facsimile mode 6 or remote diagnosis mode 7, which is read from the ROM 28 by the control section 30 and the mode switching means 4.

In this example, the specific remote station is the center terminal or the like, which diagnoses the facsimile device, hybrid machine, or the similar devices by using the communication line 1, and the telephone number (03-1234-5678), etc., of the communication enterprise is recorded in the registration means (memory means) 12 for the telephone number of the specific remote station. As the registration means 12, a nonvolatile memory such as an E$^2$PROM (an electrically erasable programmable ROM; a read only memory in which information is electrically erasable, and can be written), or a DRAM, for which memory holding operation is necessary,(a dynamic random access memory; a memory from which information can be read at any time and in which information can be written at any time), is used. Of course, the center terminal 101 is also connected to the communication line 1, and further connected to the public network 102 such as the NTT network.

Arbitrary partners are many and unspecified users having facsimile devices or hybrid machines except the center terminal 101. These partner's terminal equipment 103, 104, are connected to the communication line 1, and further connected to the public network 102. When the original image is transmitted by using these partner's terminal equipment 103, 104, etc., the communication is conducted in the normal facsimile mode.

In this example, by the result of the comparison means 11, when the telephone number of the center terminal 101 (03-1234-5678) agrees with the telephone number notified from the communication enterprise (03-1234-5678), the mode is switched from the facsimile mode 6 to the remote diagnosis mode 7 by the software by the mode switching means 4, therefore, the center terminal 101 is connected to the communication line 1, and the remote diagnosis mode or the remote setting mode can be conducted. Thereby, the center terminal 101 is connected to the communication line 1, and the control information of the facsimile devices or hybrid machines can be sent and received.

Further, when the telephone number of the center terminal 101 does not agree with the telephone number notified by the communication enterprise, the facsimile mode 6 is conducted, by connecting the communication line 1 with the terminal equipment 103, or the like, of the remote station of the telephone number notified from the communication enterprise. By this facsimile mode, for example, according to the received image data sent from the terminal equipment 103 of the remote station, the document image is printed out on the user side of the communication apparatus 100.

Accordingly, in the present embodiment, because the type of the communication mode can be early recognized by the comparison means 11, by comparing whether the telephone number by the caller ID service of the communication enterprise belongs to the center terminal 101 or whether it belongs to the terminal equipment 103, 104, . . . of many and unspecified remote stations, thereby, the time period necessary to recognize the communication mode can be more reduced than that of the conventional method. According to this method, in the case where the remote diagnosis mode 7 is conducted between the apparatus 100 and the center terminal 101, the communication mode appropriate for the remote communication enterprise can be selected before the start of the communication, and when the public network 102 such as the NTT network is used, the connection time with the communication line 1 can be reduced, thereby, the communication fee of the user can be reduced.

Figure 2:
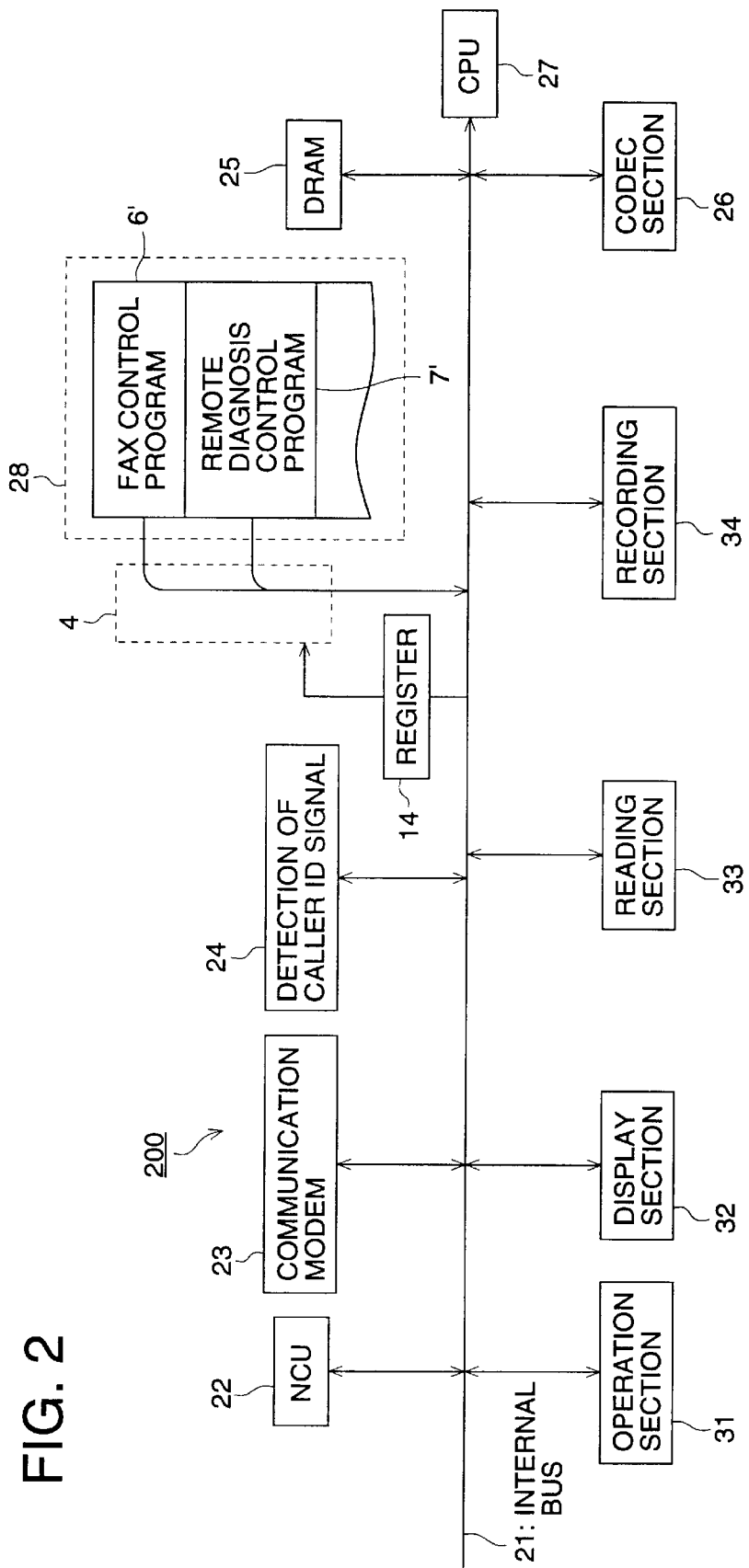
FIG. 2 is a block diagram showing an example of a structure of a hybrid machine 200 to which the communication apparatus 100 is applied.

FIG. 2 is a block diagram showing an example of the structure of a hybrid machine 200 to which the communication apparatus 100 as the present embodiment is applied. The hybrid machine 200 is provided with a copy function, facsimile function and printer function, and is structured such that the remote diagnosis mode can be conducted by using the caller ID service.

The hybrid machine 200 shown in FIG. 2 has an internal bus 21. A network control unit 22 (hereinafter, called NCU) is connected to the internal bus 21, and connection control such as call from the hybrid machine 200, receiving of calling, recovery, and disconnect processing from the center terminal 101 or many and unspecified remote stations, is conducted between the machine 200 and the public network 102 as shown in FIG. 1. For example, the ring detection is carried out by the NCU 22, and call of the remote station is received.

A communication modem 23 is connected to the NCU through the internal bus 21, and when calling is received, the modem 23 demodulates the modulated signal transmitted through the public network 102 and converts it into digital receiving image data, and when transmitting, the modem 23 modulates the document image data so as to match the frequency band of the public network 102 and converts it into a modulation signal. A caller ID signal detection section 24 as a demodulation means is connected to the communication modem 23 through the internal bus 21, and the caller ID signal from the communication enterprise is detected and demodulated. This caller ID signal is the signal showing the telephone number of the center terminal 101 or the telephone number of the remote station, and is modulated by a predetermined format of the communication enterprise. By demodulating the caller ID signal, the telephone number of the center terminal 101 or the telephone number of the remote station can be recognized.

A DRAM 25 is connected to the internal bus 21 and at least the telephone number of the center terminal 101 is previously recorded and held therein. The number of registration of the center terminals 101 (the number of telephone numbers of the terminals 101 of the remote diagnosis center) at that time is not limited to one, but any number of registration may be allowable. This DRAM 25 is also used as several types of work memories. For example, received image data sent when the facsimile mode 6 is conducted, or document image data obtained when the copy function is carried out, is temporarily stored. Further, control data such as history information of the copy function, facsimile function and printer function, is stored.

A CODEC section 26 is connected to the DRAM 25 through the internal bus 21, and an image compression and expansion circuit, or the like, is used therein. In the CODEC section 26, for example, document image data is compressed at the time of the facsimile transmission, and received image data is expanded at the time of the facsimile receiving. In the copy mode, at the time of document reading, the image data is compressed once in the CODEC section 26, and then stored in the DRAM 25. At the time of the document recording, after the image data read from the DRAM 25 is expanded, it is sent to, for example, a recording section 34.

To the CODEC section 26, a CPU 27 serving at least as the comparison means 11 is connected through the internal bus 21, and thereby, the telephone number of the center terminal 101 which is previously registered in the DRAM 25, or the like, is compared to the telephone number notified from the communication enterprise. The register rewriting signal S1 is generated according to the comparison result of the CPU 27. The mode switching means 4 is connected to the CPU 27 through the internal bus 21. The ROM 28 is connected to the mode switching means 4, and a control program 6' to conduct the facsimile mode 6, and a control program 7' to conduct the remote diagnosis mode 7 are stored therein. Of course, other than these control programs 6' and 7', a control program to conduct the printer function, algorithm for the control sequence of the mode switching means 4, or algorithm to control the overall system of the hybrid machine 200, is stored in the ROM 28.

In the above mode switching means 4, the facsimile mode 6 or the remote diagnosis mode 7 is selected according to the register rewriting signal S1 from the CPU 27 and the switching sequence by the ROM 28. Normally, the facsimile mode 6 is selected (normal position) by the control command written in the command register 14 in the mode switching means 4. The register rewriting signal S1 may be supplied from the CPU 27 to the command register 14 by providing an exclusive use control line, or may be supplied through the internal bus 21 in the data transmission format in which the register rewriting signal S1 itself is made to be a control command such as a coincidence flag.

Incidentally, in the present example, in order to realize the copy function, facsimile function and printer function, an operation section 31, display section 32, document reading section 33 and recording section 34 are connected to the internal bus 21. In the present example, the operation section is structured as an input means, which has numeral keys such as numeric keys of "0–9", and "*", "#", so that, at least, the telephone number of the center terminal 101 can be inputted. In the example, when the telephone number (03-1234-5678) is inputted by using the numeral keys in the operation section, the telephone number of the center terminal 101 is registered in $E^2PROM$, or DRAM 25 for which memory holding operation is necessary and which is non-volatile. Further, by the operation section 31, it can be set whether the switching to the remote diagnosis mode 7 is conducted or not.

In this operation section 31, when "Execution" of the remote diagnosis mode 7 is set, in the case where the telephone number of the center terminal 101 agrees with the telephone number notified from the communication enterprise, the remote diagnosis mode 7 is conducted. When "Non-execution" of the remote diagnosis mode 7 is set, even when the telephone number of the center terminal 101 agrees with the telephone number notified from the communication enterprise, the register rewriting signal S1 is not outputted from the CPU 27 to the mode switching means 4, the switching control program in the ROM 28 is not conducted, therefore, the mode is not switched from the facsimile mode 6 to the remote diagnosis mode 7. Accordingly, the remote diagnosis mode 7 is not conducted.

When a user does not want to have the contents set by the user changed, the function stated above makes the contents to remain unchanged even when the center tries to control the contents set in the machine.

In this operation section 31, other than the above described inputs, setting of the size of the recording sheets, setting of the size of the document sheets, and setting of printing out of the control data generated when the copy function, facsimile function or printer function is conducted, can also be carried out.

Further, in the display section 32, a liquid crystal display (LCD) is used, and on the display section 32, a copy image plane, facsimile image plane, printer image plane, etc., are displayed, and therefore, the selection of the copy function, facsimile function or printer function can be simply conducted. In order to increase the input operability of the user, a touch panel or the like, as an input means, is provided on the LCD surface. Of course, the display information of the copy image plane, facsimile image plane and printer image plane, is stored in the ROM 28, and the display information is read from the ROM 28 to the display section 32 through the CPU 27.

Further, in the document reading section 33, an automatic document reading apparatus (scanner) is used, and the document in the case where the copy mode is conducted, or the facsimile mode is conducted, is automatically read out. In the recording section 34, an image forming apparatus (printer) is used, and a monochromatic or color document image is formed on a predetermined recording sheet at the time of copying, facsimile recording, or printing.

In the present example, the hybrid machine 200 and other personal computers (hereinafter, simply called PC) can conduct image-communication with each other. For example, the image data of a CG image made by the PC is received by using a communication protocol such as RS-232C, and the CG image can be printed out according to the image data.

Next, referring to FIG. 3 and FIG. 4, a hybrid machine 200 to which the communication apparatus 100 of the present embodiment is applied, will be described. In the present example, it is supposed that the remote diagnosis mode 7 is conducted in which the hybrid machine 200 is diagnosed by the center terminal 101 by using the caller ID service of the communication enterprise, and that call is generated from the center terminal 101. Of course, the hybrid machine 200 is set in such a manner that the remote diagnosis mode is conducted.

Figure 3:
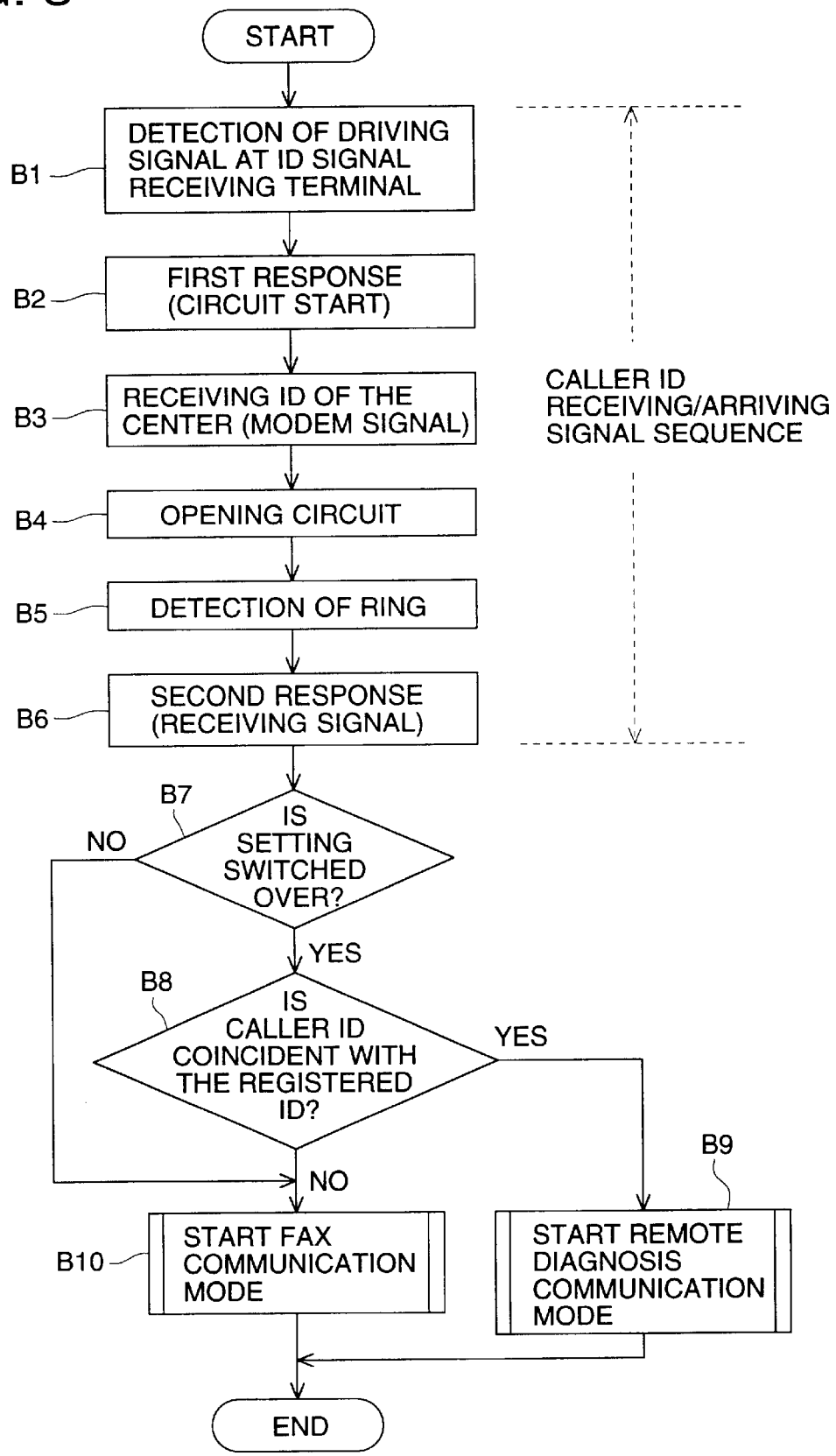
FIG. 3 is a flow chart for mode setting at the time of switching the FAX/remote diagnosis mode, showing an example of operations of the hybrid machine 200.
Figure 4:
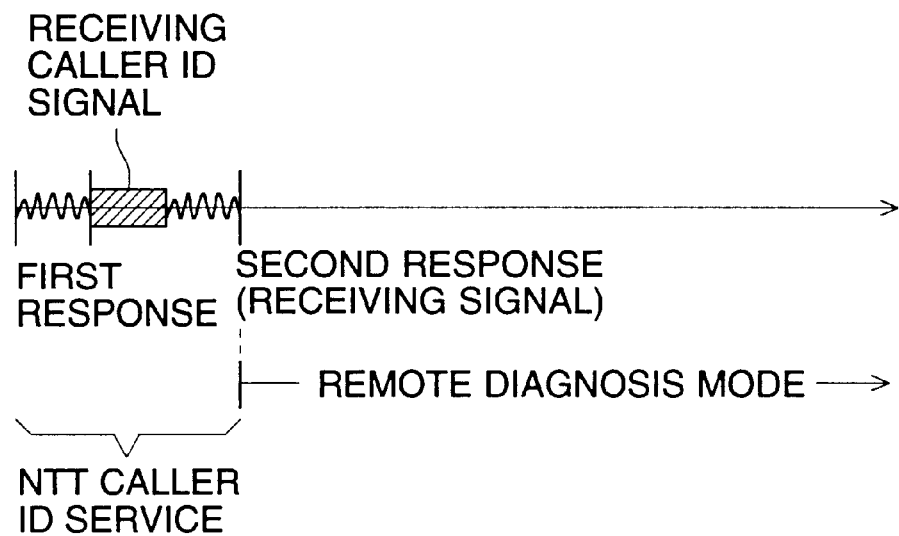
FIG. 4(A) is a time chart at the time of the remote diagnosis mode of the hybrid machine 200.
FIG. 4(B) is a time chart at the time of the facsimile mode thereof.
Figure 4:
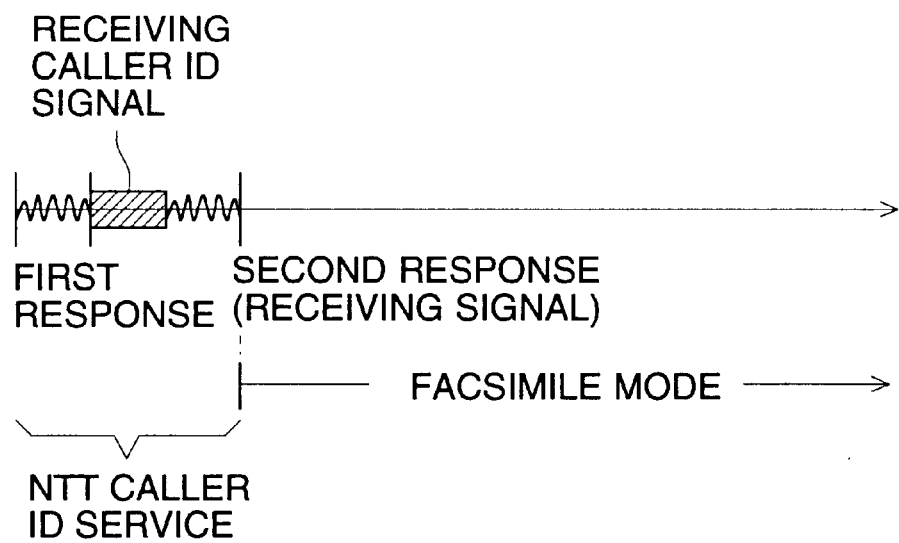
Figure 5:
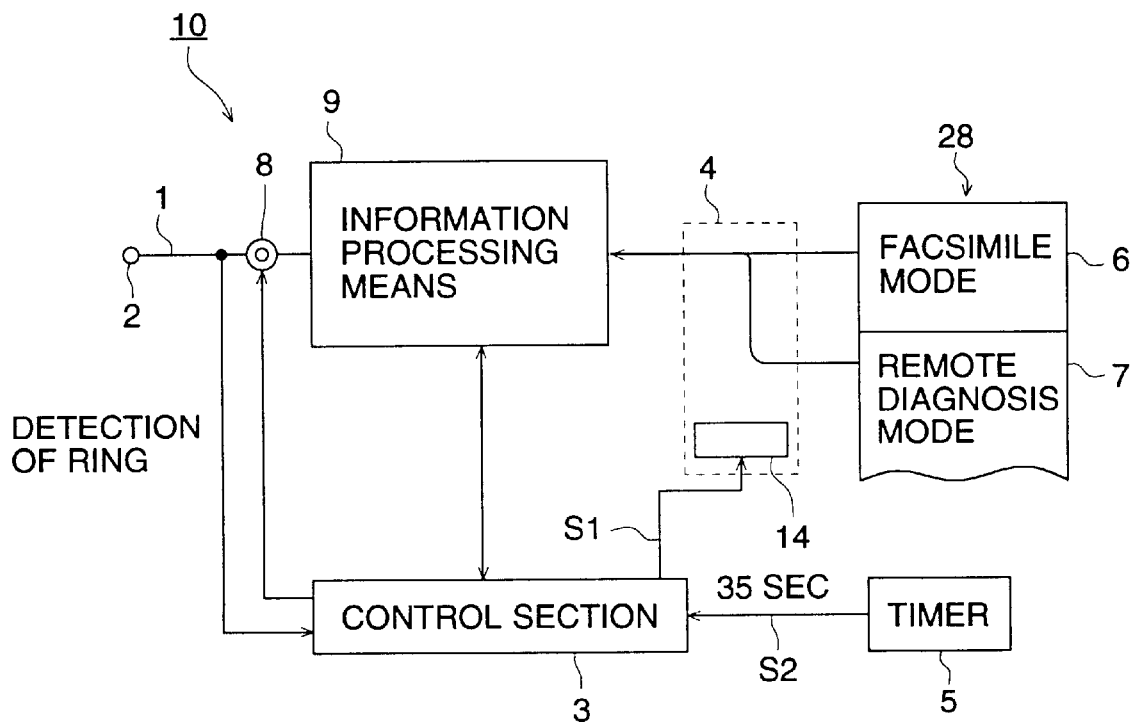
FIG. 5 is a block diagram showing an example of a structure of the conventional communication apparatus 10.
Figure 6:
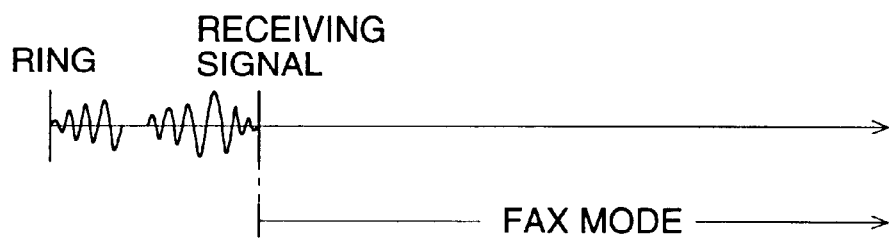
FIG. 6(A) is a time chart at the time of the facsimile mode of the communication apparatus 10.
FIG. 6(B) is a time chart at the time of the remote diagnosis mode thereof.
Figure 6:
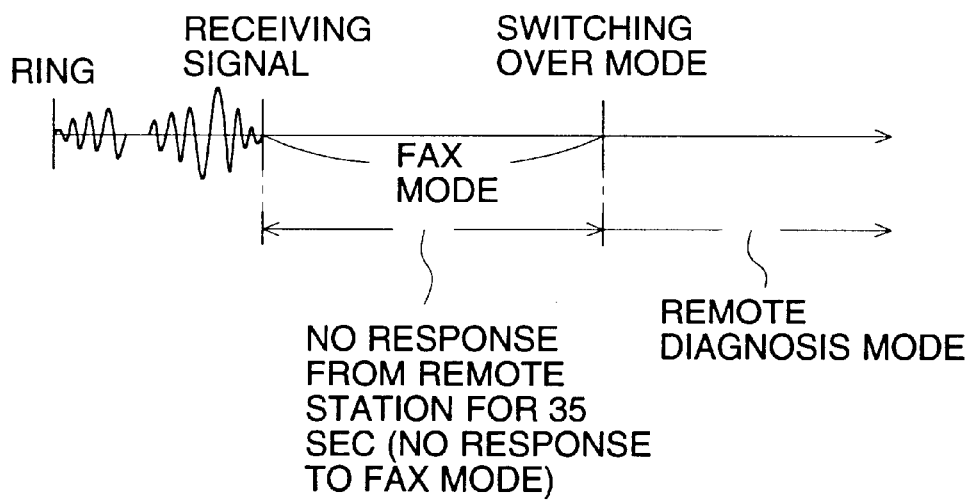
Figure 7:
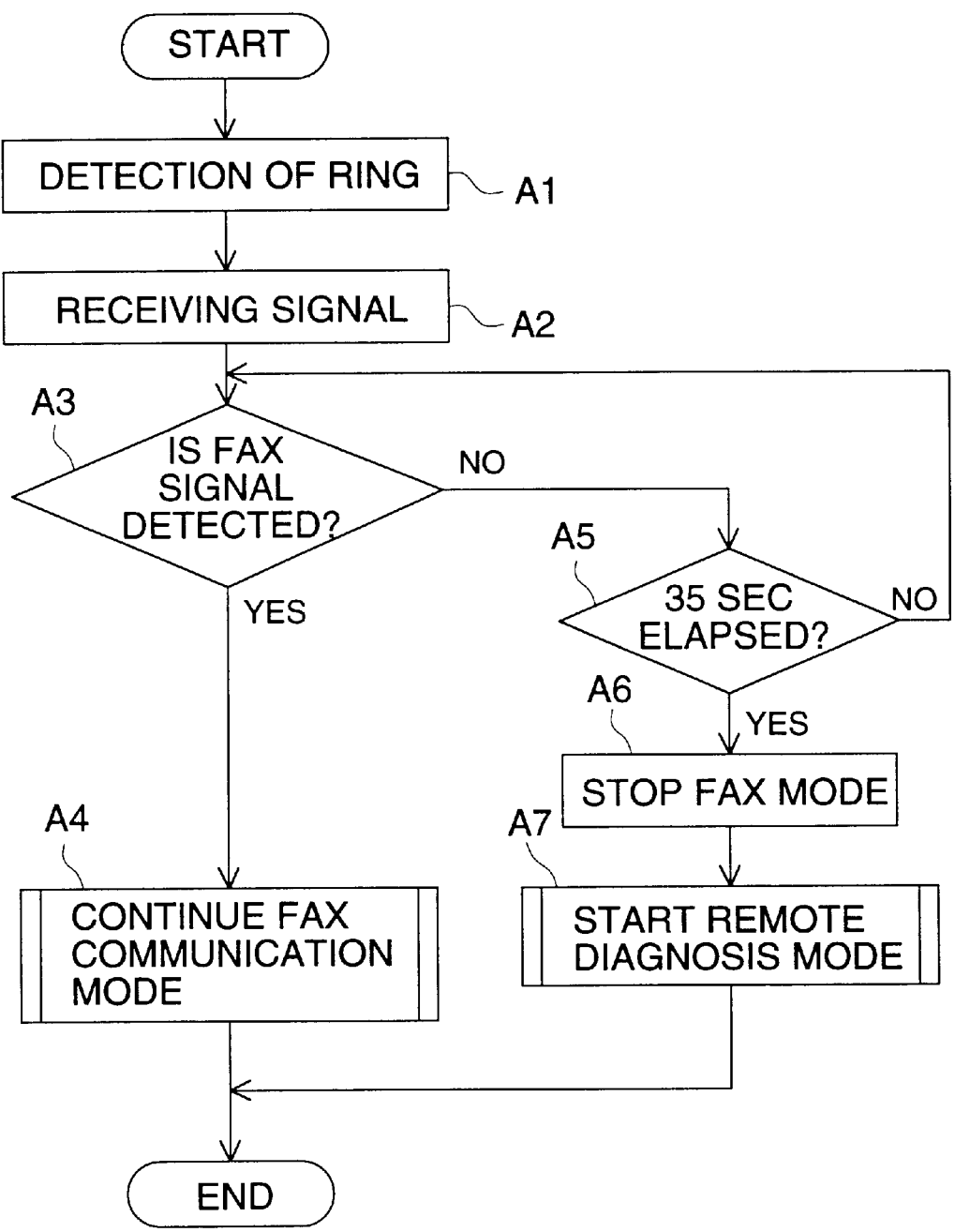
FIG. 7 is a flow chart showing an example of switching of the FAX/remote diagnosis mode of the communication apparatus 10.

In this example, in step B1–step B6 of the flow chart shown in FIG. 3, the caller ID receiving/signal receiving sequence is conducted. This sequence is mainly conducted by the NCU 22, communication modem 23 and caller ID signal detecting section 24.

That is, according to the call of the remote station, in step B1, an ID receiving terminal starting signal to the hybrid machine 200 is detected by the NCU 22. Then, in step B2, the primary response is conducted toward a switching system of the public network 102 by the NCU 22. In the primary response, the public network 102 shown in FIG. 1 and the hybrid machine 200 are closed with each other through the communication line 1.

After that, in step B3, the caller ID signal of the remote station sent from the communication enterprise (the telephone number of the center terminal) is received by the NCU 22. This caller ID signal is demodulated by the caller ID signal detecting section 24 and recognized. The telephone number of the center terminal 101 recognized herein is temporarily held in the DRAM 25.

After that, in step B4, the communication line 1 is opened by the NCU 22 so that Ringer from the public network 102 due to calling signal from the center terminal 101 can be detected. Then, in step B5, the ring from the public network 102 due to call from the center terminal 101 is detected by the NCU 22. After that, in step B6, the secondary response is conducted toward the switching system of the public network 102 through the NCU 22. In the secondary response, the call from the center terminal 101 is received. The remote diagnosis mode 7 is conducted by the calling signal.

In this example, at the reception timing of the secondary response shown in FIG. 4A, in step B7, it is judged by the CPU 27 whether the setting of the facsimile mode 6 is continued as it is, or whether the setting is switched to that of the remote diagnosis mode 7. In this example, because "execution" of the remote diagnosis mode 7 is previously set by the operation section 31, when the telephone number (03-1234-5678) of the center terminal 101 agrees with the telephone number (03-1234-5678) notified from the communication enterprise, the CPU 27 judges that the remote diagnosis mode 7 is executed.

Accordingly, in step B7, it is judged that "the setting is switched to that of the remote diagnosis mode 7", therefore, the sequence advances to step B8, and it is judged by the CPU 27 whether the telephone number notified from the communication enterprise agrees with the telephone number of the center terminal 101, which is previously registered in $E^2PROM$ or DRAM 25 for which memory holding operation is necessary. Then, when the telephone number notified from the communication enterprise agrees with the telephone number of the center terminal 101, which is registered in DRAM 25 or the like, the sequence advances to step B9, and the remote diagnosis mode is started at once. In this example, the register rewriting signal S1 is generated corresponding to the result of comparison by the CPU27, and the control command in the command register 14 in the mode switching means 4 is rewritten according to the register rewriting signal S1 and the switching control program in the ROM 28, and the mode is switched from the facsimile mode 6 to the remote diagnosis mode 7.

Corresponding to the start of the remote diagnosis mode, the control program 7' is read from the ROM 28, and the remote diagnosis mode 7 is executed. For example, in the case where the remote diagnosis mode of the hybrid machine 200 is structured such that the data modem is not used, and the control information (diagnosis data) is sent by using the fax modem in the fax sequence, by the execution of this mode, for example, the control data such as the history information of the facsimile function, copy function and printer function, which is stored in the DRAM 25, is read out in the CODEC section 26.

In this CODEC section 26, the control data is coded and compressed, and the control data is modulated through the communication modem 23. The modulated signal after modulation, is transmitted to the center terminal 101 through the NCU 22 and via communication line 1 and the public network 102. In the center terminal 101, the optimum processing can be carried out according to the control data.

Incidentally, in the remote diagnosis mode of the hybrid machine 200, the system may be structured such that the data modem is used and the procedure in the data communication is required. In this case, the communication modem 23 is a FAX modem, and although not shown, other than this, the communication modem 23' is provided as the data modem, and the control information can also be transmitted between the center terminal 101 and the hybrid machine 200.

In the case not only of the facsimile mode but also of the remote diagnosis mode, the use of a modem makes it possible to send and receive data showing control information of a hybrid device other than image data through a common telephone line, and to conduct easily processing such as compression.

Further, in step B7, when the setting to execute the remote diagnosis mode is not carried out, or in step B8, when the telephone number notified from the communication enterprise does not agree with the telephone number of the center terminal 101, which is registered in the DRAM 25 or the like, the sequence advances to step B10 at the timing of call incoming shown in FIG. 4B and starts the facsimile mode. In this case, the mode switching means 4 remains in the state that the facsimile mode 6 is selected, by the CPU 27. Accordingly, the control program 6' is read from ROM 28, and the facsimile mode 6' is executed.

By execution of this facsimile mode 6, the receiving image data sent from the remote station is received through the communication modem 23, decoded by the CODEC section 26, and the received image data is expanded. The received image data after expansion is temporarily stored in a memory such as the DRAM 25, or transferred to the recording section 34 as it is, and printed out on the recording sheet. Accordingly, the user can obtain the document image transmitted from an arbitrary remote station.

As described above, according to the hybrid machine 200 to which the communication apparatus 100 as the present embodiment is applied, the type of communication modes can be early recognized by the CPU 27, as follows. It can be early recognized by the CPU 27 whether the telephone number of the center terminal 101 by the caller ID service of the communication enterprise agrees with the telephone number of the center terminal 101, or that of terminal equipment 103, 104, . . . of many and unspecified partners, and thereby, the time period required to recognize the communication mode of the remote station can be more reduced than that of the conventional method.

According to that, the time period of 35 sec is not necessary for waiting after calling is received, as in the conventional method, and the mode can advance to the remote diagnosis mode 7 at once, therefore, the remote diagnosis mode 7 can be carried out at once between the hybrid machine 200 and the center terminal 101. Accordingly, at the start of communication, an appropriate communication mode for the remote enterprise can be selected, and when the public network 102 such as NTT is used, the connection time of the communication line 1 to the network can be reduced, thereby, the present embodiment largely contributes to the reduction of the communication fee of the user.

In the present embodiment, the case of the remote diagnosis mode 7 is described as the specific information processing mode, however, the present embodiment is not limited to that case. For example, this communication apparatus 100 can also be applied to a remote monitoring system of gas consumption or electrical energy consumption.

As described above, according to the present invention, it is compared whether the telephone number of the previously registered specific remote station coincides with the telephone number notified by the communication enterprise, and when the telephone number of the specific remote station coincides with the telephone number notified by the communication enterprise, the communication line is connected to the terminal equipment of the specific remote station, and the information is transmitted and received between the two.

According to this structure, the type of terminal equipment of the specific remote station can be early recognized, and therefore, the time period necessary to recognize the communication mode of the remote station can be more reduced as compared to the conventional method. Accordingly, the connection time of the communication line to recognize the communication mode of the remote station can be reduced, and thereby, the present invention largely contributes to the reduction of the communication fee.

The present invention can be greatly appropriately applied to a facsimile device, a hybrid machine provided with the copy function, facsimile function and printer function, or similar apparatus, which can perform the remote diagnosis by using the communication line.

What is claimed is:

1. An image forming apparatus having multiple functions for forming an image on a recording sheet by a copying mode or a facsimile mode, the image forming apparatus comprising:
   (a) recording means;
   (b) image reading means for reading an image of an original document so as to form the image in the copying mode;
   (c) a modem device for decoding data sent from a public network;
   (d) a first memory for registering telephone identification information for a remote station;
   (e) detecting means for detecting a telephone identification provided with a caller identification service of a communication enterprise; and
   (f) a controller for controlling said modem device, the controller realizing a first communication mode for receiving facsimile data so as to form the image in the facsimile mode, or a second communication mode for diagnosis of the apparatus and for setting control information of the apparatus from the remote station through said modem device,
   wherein said controller realizes the first communication mode in the case the telephone identification detected by the detecting means does not coincide with a registered telephone identification of the remote station, and realizes the second communication mode in the case the telephone identification detected by the detecting means coincides with the registered telephone identification of the remote station.

2. The apparatus of claim 1, wherein the communication of the first communication mode and the second communication mode are carried out through a common public network and a common modem device.

3. The apparatus of claim 1 further comprising a setting means for setting whether or not said second communication mode is carried out, wherein when the setting means sets that the second communication mode is not carried out, it is prohibited that the first communication mode is switched over to the second communication mode, when the telephone identification detected by the detecting means coincides with a registered telephone identification of the remote station.

4. The apparatus of claim 1 further comprising a codec section for compressing and decompressing data passed through said modem device.

5. The apparatus of claim 1 further having a printing function for forming an image on a recording sheet on the basis of image data sent from a computer by a printing mode.

6. The apparatus of claim 1 further comprising:

a second memory for storing a control algorithm for conducting the first communication mode and a control algorithm for conducting the second communication mode, and an input means for inputting the telephone identification information to the first memory, wherein the controller selects one of the control algorithms in the second memory on the basis of the result of detection of the detecting means and the telephone identification information stored in the first memory.

* * * * *